US006907671B2

(12) United States Patent
Conner (10) Patent No.: US 6,907,671 B2
(45) Date of Patent: Jun. 21, 2005

(54) EQUISECT SPAN DIVIDER (76) Inventor: Edward Lloyd Conner, 5070 San Castle Blvd., Lantana, FL (US) 33462

( * ) Notice: Subject to any disclaimer, the term of this patent is extended or adjusted under 35 U.S.C. 154(b) by 0 days.

(21) Appl. No.: 10/609,752

(22) Filed: Jun. 27, 2003

(65) Prior Publication Data

US 2004/0261279 A1 Dec. 30, 2004

(51) Int. Cl.$^7$ ............................. G01B 3/08; B43L 7/00
(52) U.S. Cl. ............................. 33/485; 33/416; 33/445; 33/464; 33/487; 33/809
(58) Field of Search ........................ 33/415, 416, 417, 33/418, 419, 423, 427, 444, 445, 452, 459, 464, 483, 485, 487, 494, 783, 787, 809

(56) References Cited

U.S. PATENT DOCUMENTS

| 407,288 | A | * | 7/1889 | Fletcher ..................... 33/415 |
| 575,671 | A | * | 1/1897 | Watts et al. ................. 33/485 |
| 1,079,457 | A | * | 11/1913 | Wesson ....................... 33/494 |
| 2,240,753 | A | | 5/1941 | Bouchard et al. |
| 4,212,108 | A | | 7/1980 | Jackson |
| 4,228,592 | A | | 10/1980 | Badger |
| 4,241,510 | A | | 12/1980 | Radecki |
| 4,506,446 | A | | 3/1985 | Mitchell |
| 5,251,382 | A | | 10/1993 | Hellar |
| 5,310,995 | A | | 5/1994 | Ouellet et al. |
| 5,367,783 | A | | 11/1994 | Nygren |
| 5,509,207 | A | | 4/1996 | Harms |
| 5,642,569 | A | * | 7/1997 | Palmer ....................... 33/809 |
| 5,647,139 | A | * | 7/1997 | Richardson ................. 33/809 |
| 5,873,175 | A | * | 2/1999 | Johnston ..................... 33/809 |
| 6,293,028 | B1 | | 9/2001 | Sylvia |
| 6,367,157 | B1 | * | 4/2002 | Diez .......................... 33/783 |
| 6,502,057 | B1 | | 12/2002 | Suzuki |
| 6,550,156 | B1 | * | 4/2003 | Scoville ..................... 33/809 |
| 2002/0088133 | A1 | | 7/2002 | McMillan |

OTHER PUBLICATIONS

Hartville Tool Catelog, "Point2.point", accessed at Http://www.hartvilletool.com/product.php on Jun. 27, 2003.

* cited by examiner

Primary Examiner—Christopher W. Fulton
Assistant Examiner—Madeline Gonzalez
(74) Attorney, Agent, or Firm—McHale & Slavin PA (57) ABSTRACT The present invention provides a measurement apparatus particularly suited for layout work. More specifically, the present invention is useful for taking a single measurement of a span or object, dividing the measured length into a desired number of equal segments, and providing indicators for marking those points.

20 Claims, 5 Drawing Sheets

EQUISECT SPAN DIVIDER

FIELD OF THE INVENTION

This invention relates to measuring instruments for layout work. More specifically, the device quickly and accurately measures the length of a span or object and provides reference measurements and/or indicators transferable to the workpiece for dividing the workpiece into a desired number of equal segments.

BACKGROUND OF THE INVENTION

Craftsmen and hobbyists alike often need to divide an object or span into equal segments. These tasks are generally performed using measuring devices such as tape measures or coilable rules for determining the length of a given distance. Thereafter, the user typically utilizes mathematics to divide the total measured length into the number of desired equal segments and individually marks each of these divisions. While providing satisfactory results, generating the equal divisions requires time-consuming mathematical calculations that are prone to error. These calculations may be further complicated by unit conversions or odd length measurements.

Accordingly, what is lacking in the art is a layout device for quickly and accurately measuring the length of a span or object and providing reference measurements and/or indicators transferable to the workpiece for dividing the workpiece into a desired number of equal segments.

DESCRIPTION OF THE PRIOR ART

A number of prior art measuring devices exist for facilitating the equal division of an object or span.

U.S. Patent Application No. 2002/0088133, to McMillan discloses a spacing device having a length of uniformly stretchable elastic cord pre-marked with equally spaced marks. The cord is stretched between a given span such that the distance between each of the marks on the cord are evenly spaced, thereby providing a quick reference of one or more evenly spaced points along the span. The cord is typically stored on a reel and may be housed in any suitable casing. The elastic cord is unwound from the reel and stretched as necessary across the span to be divided until a mark on the cord is positioned over a point of the span to be divided. From the marks on the cord, the user is able to determine the location of one or more points that divide the span. While this device is capable of providing indicators for multiple segments it is incapable of the precision required for many projects.

U.S. Pat. No. 2,240,753, to Bouchard, et al. discloses a measuring device useful for internal and external measurement of objects. The device consists of a casing having a pair of coiled complementary scales mounted therein. Mounted transversely in the center portion of the casing in a parallel closely spaced arrangement are a pair of rotary drums, each having radially projecting sprockets or teeth. The teeth on the drums are adapted to intermesh with each other and with a linear array of apertures that extend along the centerline of both scales. While this device is capable of extending a second scale to the same degree as the first, the device is incapable of providing any indicators for more than two divisions of the object without using mathematics to determine a segment length.

U.S. Pat. No. 4,212,108, to Jackson discloses a layout tool particularly designed for laying out the location of wall framing studs. The tool includes at least one straight elongated bar having a plurality of pivoting bar segments attached to its top surface. The bar segments are constructed to pivot between a position parallel to the elongated bar for space saving storage and a position perpendicular to the elongated bar for laying out the position of wall studs. The bar segments are positioned such that when the segments are perpendicular to the elongated bar, the distance between the segments corresponds to the distance between the framing studs. In operation, the carpenter pivots the bar segments into the perpendicular position, lays the bar along the baseboard and uses a pencil to mark a line along each side of the bar segments, marking the position of the studs.

U.S. Pat. No. 4,241,510, to Radecki discloses a device for aiding in the hanging of a picture or similar wall supported member. The device is constructed in the shape of an inverted T having cross arms and a neck part. Each arm carries a slide member upon which the hanging wire can be fitted. The slide members are moved along the arms to predetermined points so that the wire will not extend above the top of the frame when the picture is hung. The neck of the T is used to mark the top of the picture. The device also carries a level to facilitate proper orientation of the picture.

U.S. Pat. No. 4,506,446, to Mitchell discloses a linear tape type measuring device with two tapes adapted for measuring the linear distance between two points and registering the distance between the distal ends of the tapes on a counter. When either tape is extended, the total distance between the ends of the tape are registered on a counter mounted in the housing. This allows a desired measurement to be taken anywhere between the two end points. The invention also allows two measurements to be taken simultaneously. For example, one tape can measure the rise of a step while the other measures the run, the total of both the rise and the run are then summed on the counter.

U.S. Pat. No. 5,367,783, to Nygren discloses a layout tool useful for marking the position of building materials such as studs, joists, rafters, trusses and rough door opening trimmer studs. The device includes an elongated extruded member having a plurality of indicia markings indicating standard door sizes and the like. Templates having the same width as the building materials are constructed and arranged to interlock with the extruded member to maintain a perpendicular relationship. The templates are positioned along the extruded member and held in position with a suitable fastener.

U.S. Pat. No. 5,509,207, to Harms discloses a speed layout stick comprised of an oblong bar having a handle secured to its midpoint. The oblong bar has four pairs of apertures spaced at sixteen inch intervals. A lead stick is positioned in each of the apertures and held in position by lead holders positioned adjacent to the apertures. In operation, the carpenter would position the oblong bar and use the handle to pull the bar across the object to be marked thereby leaving eight parallel marks.

U.S. Pat. No. 6,293,028, to Sylvia discloses a construction tool for laying out stud marks on a residential house with a pitched roof. The tool includes an elongated measuring member to which adjustable stud-marking members are spaced transversely along the length. The stud-marking members are positioned for a specific roof pitch using conversion indicia on one or more of the marking members. The tool is thereafter placed along the board or rafter and a mark is made along each of the marking members for stud placement.

Typically these devices have very limited and specific uses and therefore have difficulties associated with combining efficiency and precision to facilitate changing from one type of project to another. The devices that can be changed quickly from one size object and/or span to another generally lack precision, while the devices capable of high precision require a significant amount of time to set-up. Nothing in the prior art teaches or suggests a device which operates using slidable scales and a center hub for measuring and dividing the measured length into a desired number of equal segments with a high degree of precision, for which the device provides indicators for marking those points. Furthermore the prior art fails to teach or suggest an electronic digital device having a main beam and a slider capable of measuring and dividing the measured length into a desired number of equal segments for which the device provides indicators along an LED or LCD screen for marking said segments.

SUMMARY OF THE INVENTION

The present invention provides both an electronic and a mechanical device for quickly and accurately measuring the length of a span or object and providing reference measurements and/or indicators transferable to the workpiece for dividing the workpiece into a predetermined number of equal segments.

The mechanical embodiment generally includes a telescoping body capable of expanding or contracting to the length of a span or object, a center hub for indicating the central point and segment reference points for the object, and a traversing means in mechanical engagement with the telescoping body and the center hub to maintain the center hub equidistant from the distal ends of the telescoping body as it is adjusted to the size of the workpiece. The preferred mechanical embodiment of the device includes four U-shaped inner slide members and four U-shaped outer slide members in a telescoping arrangement. The telescoping members are arranged, generally parallel, in two pairs with the open portion of the U-shapes facing inward forming a generally rectangular shape. Two of the inner slides and two of the outer slides attach to a first end cap in a diagonal arrangement at the first end, and the opposite two inner and two outer slide members attach to the second end cap at a second end in an opposite diagonal fashion. This arrangement allows four slides to be attached to each end cap while allowing the opposite slides to have free movement through the end caps as the body is telescoped inwardly or outwardly. The bottom section of each U-shaped inner slide includes a linear gear rack which cooperates with gears located inside the center hub to cause the hub to remain equidistant from the ends of the slides as the slides are telescoped inward or outward. The outer slides are constructed with various scale indicia which are proportionate to the full scale indicia to indicate a predetermined quantity of equal divisions. In operation, the device is placed on the surface to be divided with the scale indicia corresponding to the desired quantity of divisions closest to the work surface. The slides are telescoped inwardly or outwardly to the desired length of the project. The full scale indicia number that aligns with the hub center mark on the top of the device is noted and marked on the workpiece adjacent to the scale indicia closest to the workpiece. The scale adjacent to the workpiece is generally proportional to the full scale thereby resulting in the desired number of division. For an even number of divisions, e.g. 2, 4, 6, etc. the center point is also marked. For odd numbered divisions, e.g. 3, 5, 7, etc., the center point is not marked.

An electronic embodiment of the device includes a cooperating beam and a movable slide. The cooperating beam and slide include an electronic processing means well known in the art capable of measuring the movement of the slide, and software constructed and arranged for calculating the length of the segments based on operator input, and displaying segment indicators. The beam includes at least one and preferably two digital readout means, e.g. LED, LCD or the like, in communication with the processing means and extending along the length of the beam to display the measurement and segment indicators. In operation, the electronic device is placed against the object or span to be divided and the slide extended to the desired length. The movement of the slide along the beam generates a signal to the electronic processing means which registers the length of the object to be divided. The operator inputs the desired number of divisions and the processing means converts the total length into the required segment lengths and displays the indicator points along the beam on the digital readout means.

The construction of both layout device embodiments allows quick and precise division of objects or spans into equal segments. The construction of the layout devices also provides versatility by allowing the quantity of segments and/or length of measurement to vary from one workpiece to another without changing a set-up, thereby improving efficiency as compared to the prior art.

Accordingly, a primary objective of the instant invention is to teach a mechanical layout apparatus for dividing a span or object into a predetermined quantity of equal segments.

Another objective of the instant invention is to teach an electronic layout apparatus for dividing a span or object into a predetermined number of equal segments.

A further objective of the instant invention is to teach an adjustable layout apparatus for measuring and providing layout points for equal division of the measured span or object.

Yet another objective of the instant invention is to teach an adjustable layout apparatus for laying out equal divisions of a span or object that is durable in construction, dependable to use and economical to manufacture.

Other objectives and advantages of this invention will become apparent from the following description taken in conjunction with the accompanying drawings wherein set forth, by way of illustration and example, certain embodiments of this invention.

DETAILED DESCRIPTION OF THE PREFERRED EMBODIMENT

Figure 1:
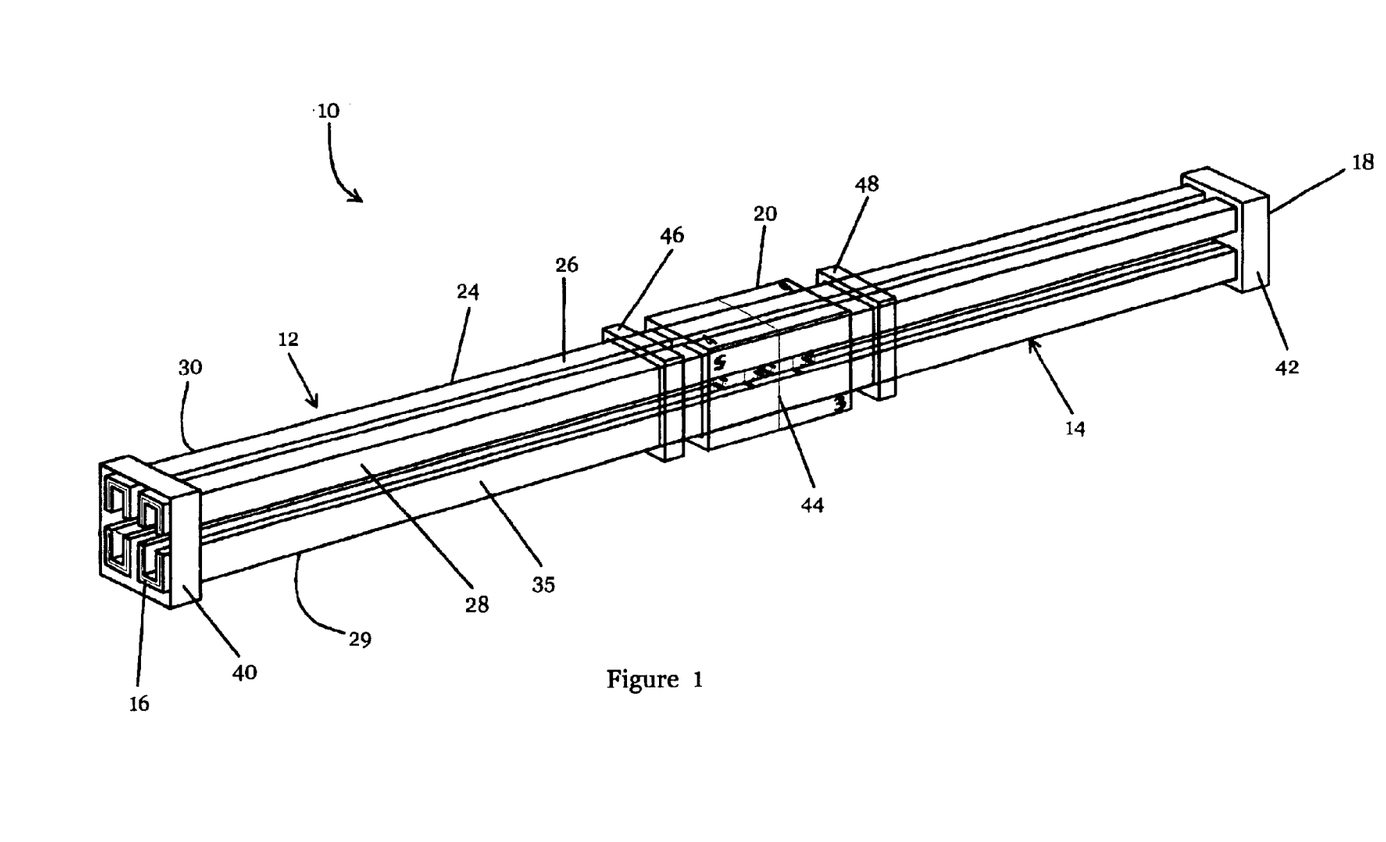
FIG. 1 is a perspective view illustrating the preferred mechanical embodiment of the instant invention.
Figure 2:
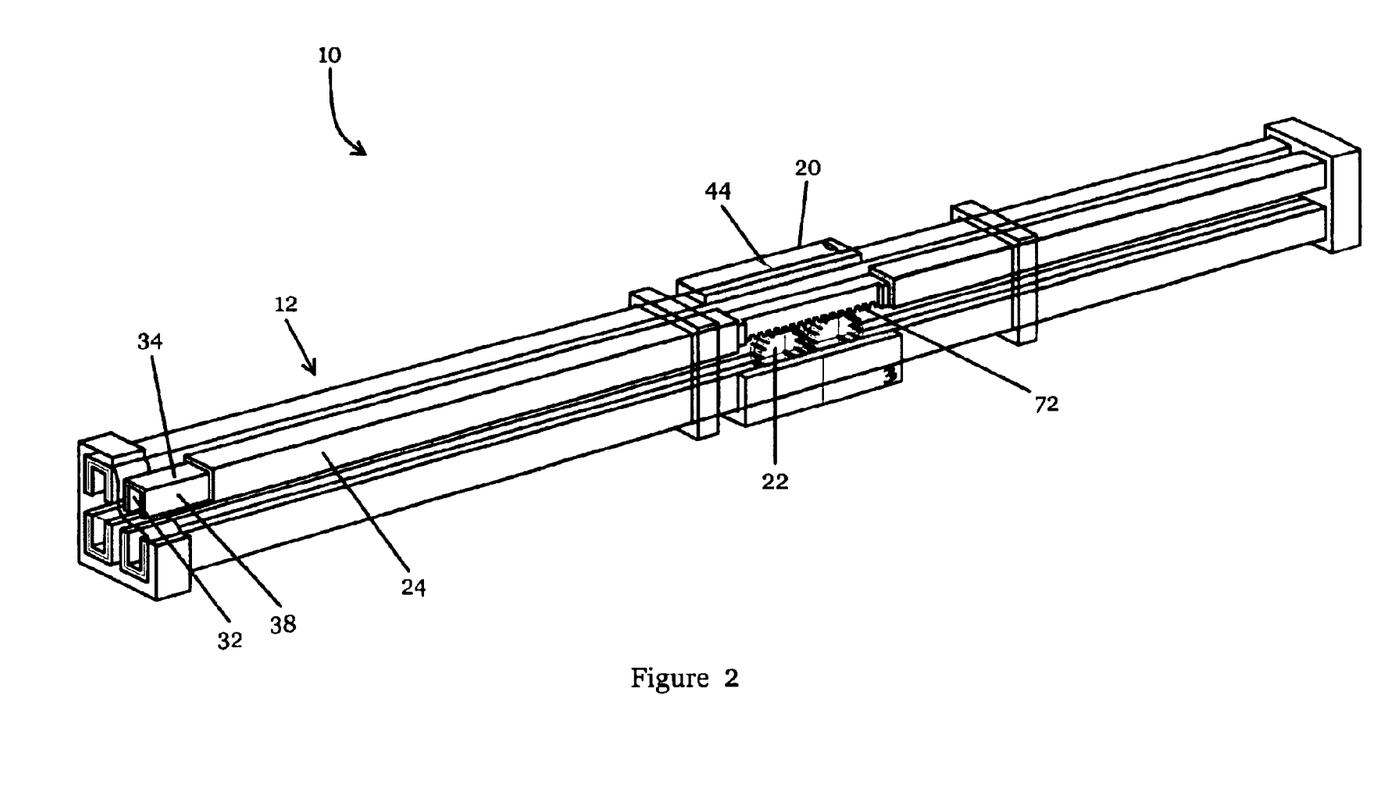
FIG. 2 is a perspective view of the embodiment shown in FIG. 1 partially in section illustrating the hub gears in cooperation with the inner slide members.
Figure 3:
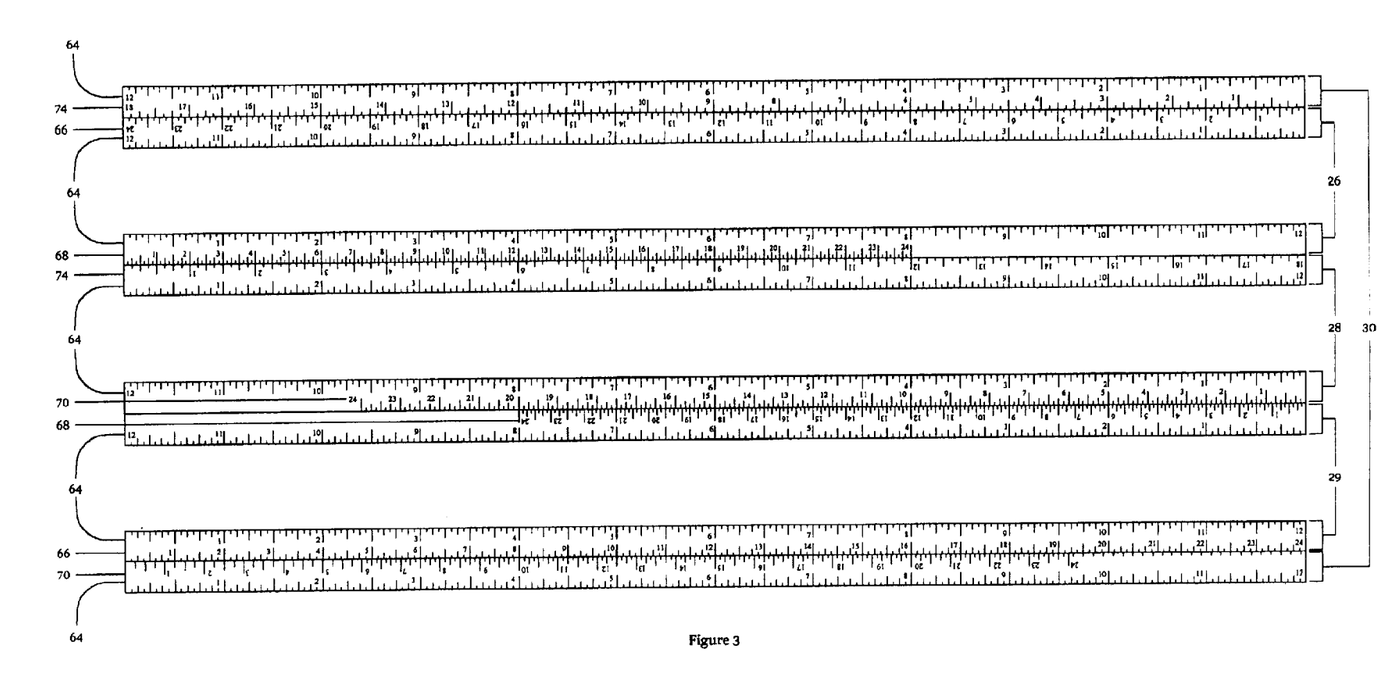
FIG. 3 illustrates the four scale surfaces of the device shown in FIG. 1 illustrating various scale means utilized on the instant invention.

Referring now to FIGS. 1 through 3, illustrated is the apparatus, designated generally as the preferred mechanical embodiment of the Equisect Span Divider 10. The Equisect device quickly and accurately telescopes to the length of a span or object and provides reference measurements and/or indicators transferable to the workpiece for dividing the workpiece into a predetermined number of equal segments. The mechanical embodiment 12 of the Equisect 10 generally includes a telescoping body 14 capable of expanding or contracting to the length of a span or object, a center hub 20 for indicating the central point and segment reference points for the object, and a traversing means 22 in mechanical engagement with the telescoping body and the center hub to maintain the center hub an equidistance from the distal ends of the telescoping body as it is elongated or shortened.

Figure 4:
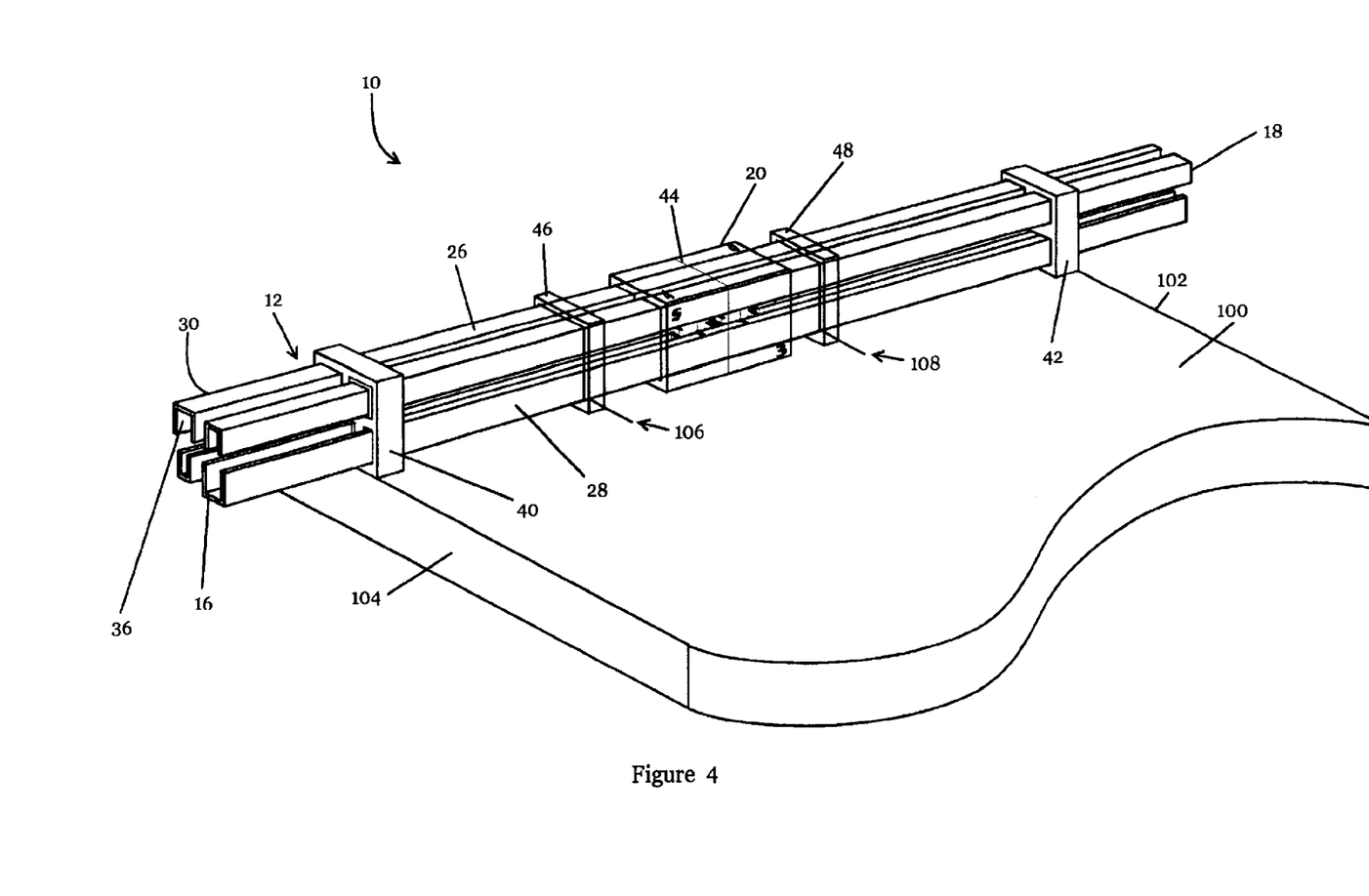
FIG. 4 a perspective view illustrating the operation of the embodiment shown in FIG. 1.

The preferred telescoping body 14 is comprised of four telescoping members illustrated herein in a non-limiting embodiment as interfitting outer and inner U-shaped slide members 24 and 38. The outer slide members 24 having a first end 16, a second end 18, an outer surface 35, and an inner surface 36 (FIG. 4). The U-shaped inner slide members 38 include a first end 16, a second end 18, an inner surface 32 and an outer surface 34. The outer surface 34 of the inner slide member 38 is constructed and arranged to slidingly cooperate with the inner surface 36 of the outer slide member 24 to allow the inner and outer slide members to extend or retract in a telescoping fashion. The telescoping members are arranged, generally parallel, in two pairs with the open portion of the U-shapes facing inward forming a generally rectangular shape. Two of the inner slides 38 and two of the outer slides 24 attach to a first end cap 40 in a diagonal arrangement at the first end 16 and the opposite two inner and two outer slide members attach to the second end cap 42 at the second end 18 in an opposite diagonal fashion. This arrangement allows four slides to be attached to the first end cap while allowing four slides to also be attached to the second end cap. The first end cap is constructed and arranged to allow the slides attached to the second end cap to move freely therethrough as the body is telescoped inwardly or outwardly, and the second end cap is constructed and arranged to allow the slides attached to the first end cap to pass freely therethrough as the body is telescoped inwardly or outwardly. It should be noted that other shapes and/or quantities of telescoping members constructed and arranged to provide an even number of diametrically opposed surfaces and operatively linked to the central hub may be utilized in place of the U-shaped members illustrated herein.

The center hub 20 is generally a tubular member constructed and arranged to fit around the telescoping body 14 in a manner that allows the slide members 24 and 38 to freely telescope inwardly and outwardly. The hub is preferably constructed of a clear material such as plastic and includes a center indicator mark 44 used in conjunction with the first scale means for indicating the center point and half of the overall length between the first end 16 and the second end 18 of the Equisect device.

The preferred traversing means includes a linear gear rack 72 secured to the inner surface 32 of each inner slide 38. In a most preferred embodiment the gear racks and the inner slides are molded as a single piece. The gear racks are arranged to cooperate with at least one gear 22 and preferably two gears rotatably mounted within the center hub 20 to cause the inner slides 38 to move generally equal amounts inwardly or outwardly while the center hub remains equidistant from the ends of the telescoping body 14. It should also be appreciated that other traversing means well known in the art capable of causing the slide members to extend or retract about an equal amount while maintaining the hub at about the center point which may include but should not be limited to, cable and/or belt and pulley arrangements, may also be utilized.

The outer surface of the generally rectangular telescoping body 14 includes a first scale surface 26, a second scale surface 28, a third scale surface 29 and a fourth scale surface 30. Each scale surface generally includes at least one indicia means printed or engraved thereon. It should be noted that while the scale means illustrated herein are in inches, other suitable units well known in the art may be substituted. In a preferred embodiment, the indicia printed on the first scale surface 26 and the third scale surface 29 includes a first scale means of full scale length representative indicia 64 (FIG. 3), a second scale means of half scale length representative indicia 66, and a third scale means of one-third scale length representative indicia 68. The first scale means is constructed and arranged to cooperate with the center mark on the center hub to measure the length of the span or object to be divided and provide a center reference number which can be transferred to one of the other scale means to provide equal divisions of the overall length of the span or object. The second scale means is constructed and arranged proportionally to the first scale means to indicate four equal segments of the measured length when the center reference number is transferred thereto. The third scale means is constructed and arranged proportionally to the first scale means to indicate six equal segments of the measured length when the center reference number is transferred thereto.

The indicia printed on the second scale surface 28 and the fourth scale surface 30 generally includes a first scale means of full scale length representative indicia 64, a fourth scale means of two fifths scale length indicia 70, and a fifth scale means of two-third scale length indicia 74. The fourth scale means is constructed and arranged proportionally to the first scale means to indicate 5 equal segments of the measured length when the center reference number is transferred thereto. The fifth scale means is constructed and arranged proportionally to the first scale means to indicate 3 equal segments of the measured length when the center reference number is transferred thereto. In this manner the reference number indicated below the centerline 44 of the hub 20, from the first scale means, can be noted and marked on the scale indicia closest to the workpiece to give the operator the desired quantity of equal length segments.

Referring to FIG. 4 the mechanical embodiment of the Equisect device is illustrated in operation. The Equisect 10 is shown measuring a project 100 for division into 3 about equal segments. The end caps 40 and 42 are lined up with project edges 102 and 104 and the center reference measurement is read from the first scale surface 26 as indicated by center indicator mark 44. The reference number can then be transferred to the second scale surface 28 and the fourth scale surface 30 which each include a fifth scale means 74. The reference number can be marked on the project 100 adjacent to the fifth scale means 74 to provide 3 about equal divisions of the project as shown by marks 106 and 108. Alternatively the reference number can be transferred from one side of the device to another using one or both of the slip rings 46 and 48. The slip rings 46 and 48 are constructed and arranged to slide along the telescoping members.

Figure 5:
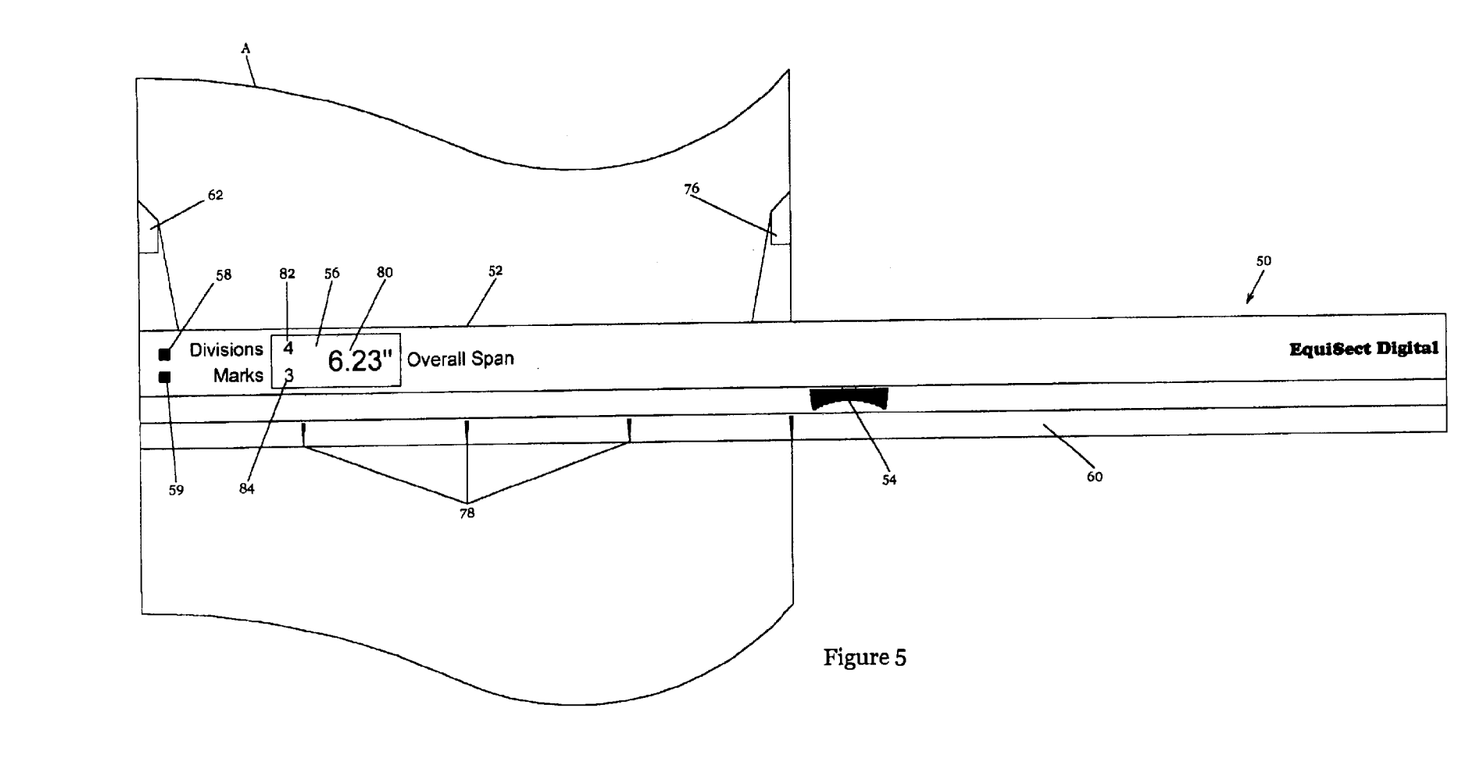
FIG. 5 is an perspective view illustrating an electronic embodiment of the instant invention.

Referring to FIG. 5 the electronic embodiment 50 of the Equisect device is illustrated. The electronic embodiment generally includes an elongated beam member 52, a slide member 54, a processing means (not shown), a first display means 56, a second display means 60, a first input means 58, and a second input means 59.

The beam member 52 is generally an elongated rectangle having adequate length to span the desired project. The beam member may also include an optional jaw member 62 extending perpendicularly from the first end of the beam member 52. The slide member 54 is generally constructed and arranged to slide along the beam member and may also include a jaw member 76 extending perpendicular in relation to the beam member. The slide member 54 is constructed and arranged to be in electrical communication with the processing means to measure the movement of the slide member. The electronic processing means (not shown) is capable of measuring the movement of the slide, software cooperates with the electronic processing means to calculate the length of the segments based on operator input and display segment indicators 78 along the beam 60, and input means 59 is provided to convert between English and Metric units. The beam 52 includes at least one digital display means 56, e.g. LED, LCD, or the like, in communication with the processing means to display the measurement length 80, the number of divisions 82 based on operator input, and the number of marks required 84. The preferred embodiment includes a second display means 60 that extends along the length of the beam 52 for displaying the segment indicators. In operation, the electronic device 50 is placed against the object or span A to be divided into segments and the slide 54 is extended to the desired length. The movement of the slide 54 along the beam 52 generates a signal to the electronic processing means which registers the length of the object to be divided in the first display means 56. The operator inputs the desired number of divisions using input button 58 and the processing means converts the total length 80 into the required segment lengths and displays the indicator points 78 along the beam 52 on the second digital display means 60.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

We claim:

1. A mechanical layout device for measuring a span or object and providing reference measurement indicators transferable to the workpiece for dividing the workpiece into a predetermined number of equal segments comprising:

a telescoping body capable of expanding or contracting to the length of said span or object, said telescoping body having a first end and a second end, said telescoping body including at least one outer slide member and at least one inner slide member, said outer slide member including at least one full scale indicia means printed thereon, and at least one proportional scale means printed thereon;

a hub, said hub having a center indicator line for cooperating with said full scale indicia means for indicating the central point of said span or object, said central point transferable to said proportional scale means to indicate said equal segments;

a traversing means in mechanical engagement with said telescoping body and said hub, said traversing means constructed and arranged to maintain said hub generally equidistant from the distal ends of said device as said telescoping means are telescoped inwardly or outwardly.

2. The mechanical layout device of claim 1 wherein said telescoping members are constructed and arranged to provide an even number of diametrically opposed scale surfaces, wherein said telescoping members are operatively linked to said central hub through said traversing means.

3. The mechanical layout device of claim 1 wherein said telescoping body includes:

at least four U-shaped outer slide members having a first end, a second end, an inner surface, and an outer surface;

at least four U-shaped inner slide members having a first end, a second end, an inner surface and an outer surface, said outer surface of said inner slide member constructed and arranged to cooperate with said inner surface of said outer slides in a telescoping manner;

wherein said at least four outer slide members and said at least four inner slide members are arranged into two pair of telescoping sub-assemblies;

wherein said two pair of telescoping sub-assemblies are arranged into a generally rectangular shape with the open portion of said U-shaped members facing inward in a generally rectangular opposing fashion, wherein two of said outer slide members and two of said inner slide members are secured to a first end cap in an opposing diagonal fashion, and two of said outer slide members and two of said inner slide members are secured to a second end cap in an opposing diagonal fashion;

wherein said first end cap is constructed and arranged to allow said slide members attached to said second end cap to move freely therethrough as said telescoping body is telescoped inwardly or outwardly;

wherein said second end cap is constructed and arranged to allow said slide members attached to said first end cap to pass freely therethrough as said telescoping body is telescoped inwardly or outwardly;

wherein said generally rectangular telescoping body includes a first indicia surface, a second indicia surface, a third indicia surface, and a fourth indicia surface, wherein each said indicia surface includes at least one indicia printed thereon.

4. The mechanical layout device of claim 3 wherein said traversing means includes a linear gear rack molded within the bottom portion of said inner surface of each said U-shaped inner slide member; and at least one gear rotatably mounted to said hub, said at least one gear constructed and arranged to cooperate with said inward facing U-shaped inner slide member gear racks to cause said opposing U-shaped inner slide members to move about an equal amount in an opposite direction inwardly or outwardly in relation to said opposing inner slide member while said hub remains about centered.

5. The mechanical layout device of claim 3 wherein said indicia printed on said first indicia surface includes a first scale means, and a second scale means constructed and arranged to be proportionate to said first scale means;
   wherein said center distance indicated on said first scale means by said center hub can be transferred to said second scale means to provide indicators for dividing said measured span or object into a predetermined number of equal length segments.

6. The mechanical layout device of claim 5 wherein said second scale means is constructed and arranged to have indicia half scale in proportion to said first scale indicia;
   wherein marking said object or span at said indicated first scale center point and marking said object or span at said center reference number along said second scale means indicates four about equal segments.

7. The mechanical layout device of claim 5 wherein said indicia printed on said first indicia surface includes a third scale means constructed and arranged to be proportionate to said first scale means;
   wherein said center distance indicated on said first scale means by said center hub can be transferred to said third scale means to provide indicators for dividing said measured span or object into a predetermined number of equal length segments.

8. The mechanical layout device of claim 7 wherein said third scale means is constructed and arranged to have indicia one third scale in proportion to said first scale indicia;
   wherein marking said object or span at said indicated first scale center point and marking said object or span at said center reference number along said third scale means indicates six about equal segments.

9. The mechanical layout device of claim 3 wherein said indicia printed on said second indicia surface includes a first scale means, and a fourth scale means constructed and arranged to be proportionate to said first scale means;
   wherein said center distance indicated on said first scale means by said center hub can be transferred to said fourth scale means to provide indicators for dividing said measured span or object into a predetermined number of equal length segments.

10. The mechanical layout device of claim 9 wherein said fourth scale means is constructed and arranged to have indicia two fifths scale in proportion to said first scale indicia;
    wherein marking said object or span at said indicated center reference number along said fourth scale means indicates five about equal segments.

11. The mechanical layout device of claim 9 wherein said indicia printed on said second indicia surface includes a fifth scale means constructed and arranged to be proportionate to said first scale means;
    wherein said center distance indicated on said first scale means by said center hub can be transferred to said fifth scale means to provide indicators for dividing said measured span or object into a predetermined number of equal length segments.

12. The mechanical layout device of claim 11 wherein said fifth scale means is constructed and arranged to have indicia two third scale in proportion to said first scale indicia;
    wherein marking said object or span at said indicated center reference number along said fifth scale means indicates three about equal segments.

13. The mechanical layout device of claim 3 wherein said indicia printed on said third indicia surface includes a first scale means, and a second scale means constructed and arranged to be proportionate to said first scale means;
    wherein said center distance indicated on said first scale means by said center hub can be transferred to said second scale means to provide indicators for dividing said measured span or object into a predetermined number of equal length segments.

14. The mechanical layout device of claim 13 wherein said second scale means is constructed and arranged to have indicia half scale in proportion to said first scale indicia;
    wherein marking said object or span at said indicated first scale center point and marking said object or span at said center reference number along said second scale means indicates four about equal segments.

15. The mechanical layout device of claim 13 wherein said indicia printed on said third indicia surface includes a third scale means constructed and arranged to be proportionate to said first scale means;
    wherein said center distance indicated on said first scale means by said center hub can be transferred to said third scale means to provide indicators for dividing said measured span or object into a predetermined number of equal length segments.

16. The mechanical layout device of claim 15 wherein said third scale means is constructed and arranged to have indicia one third scale in proportion to said first scale indicia;
    wherein marking said object or span at said indicated first scale center point and marking said object or span at said center reference number along said third scale means indicates six about equal segments.

17. The mechanical layout device of claim 3 wherein said indicia printed on said fourth indicia surface includes a first scale means, and a fourth scale means constructed and arranged to be proportionate to said first scale means;
    wherein said center distance indicated on said first scale means by said center hub can be transferred to said fourth scale means to provide indicators for dividing said measured span or object into a predetermined number of equal length segments.

18. The mechanical layout device of claim 17 wherein said fourth scale means is constructed and arranged to have indicia two fifths scale in proportion to said first scale indicia;
    wherein marking said object or span at said indicated center reference number along said fourth scale means indicates five about equal segments.

19. The mechanical layout device of claim 17 wherein said indicia printed on said first indicia surface includes a fifth scale means constructed and arranged to be proportionate to said first scale means;
    wherein said center distance indicated on said first scale means by said center hub can be transferred to said fifth scale means to provide indicators for dividing said measured span or object into a predetermined number of equal length segments.

20. The mechanical layout device of claim 19 wherein said fifth scale means is constructed and arranged to have indicia two third scale in proportion to said first scale indicia;
    wherein marking said object or span at said indicated center reference number along said fifth scale means indicates three about equal segments.

* * * * *